Jan. 15, 1963  E. M. MOVILLA ET AL  3,073,265
SUGAR CANE PLANTING MACHINE
Filed Jan. 14, 1960  5 Sheets-Sheet 3

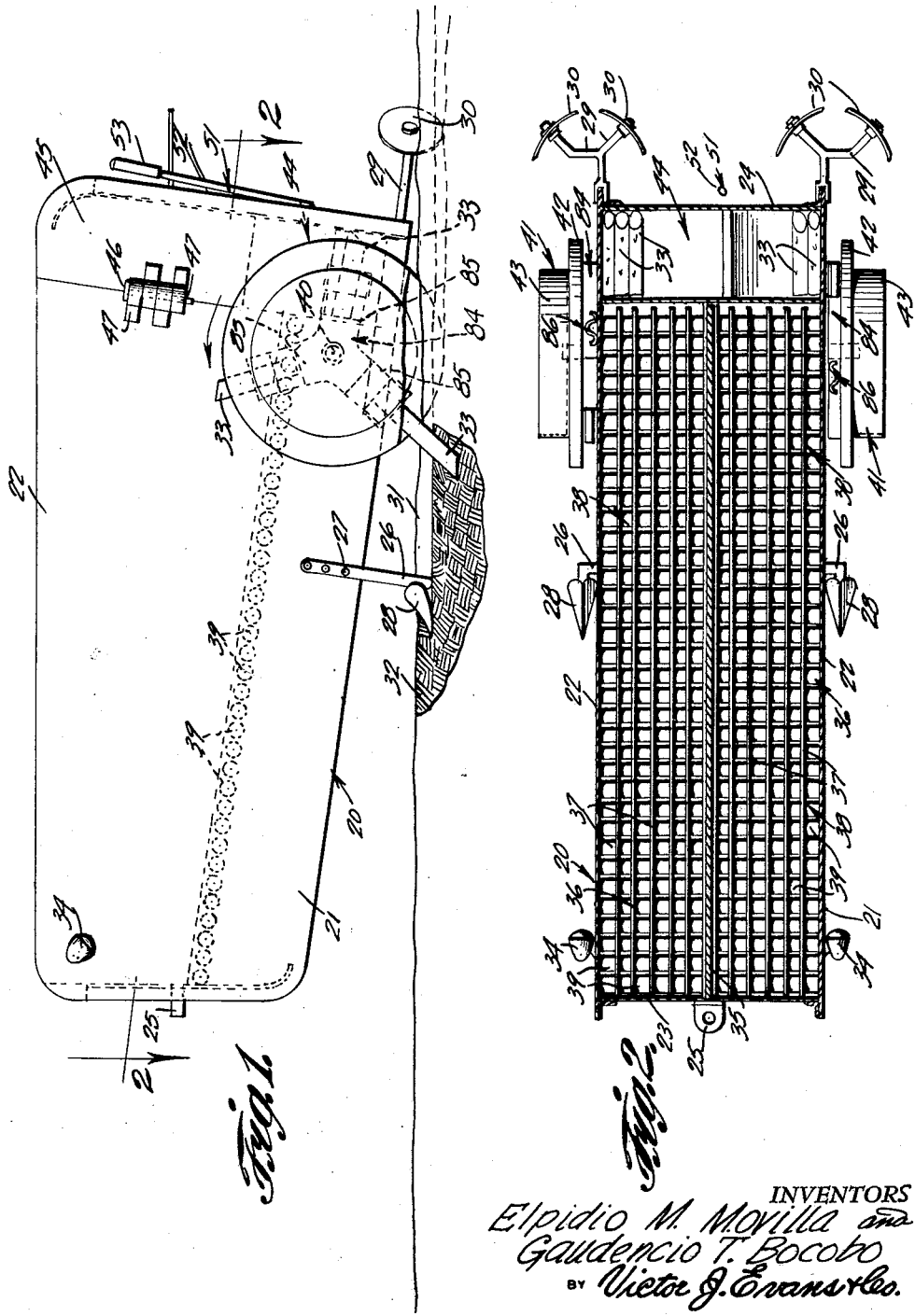

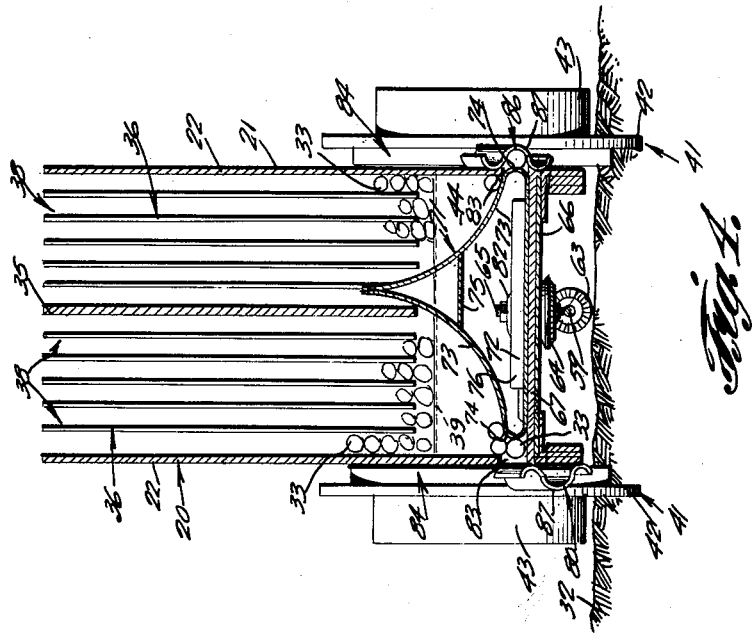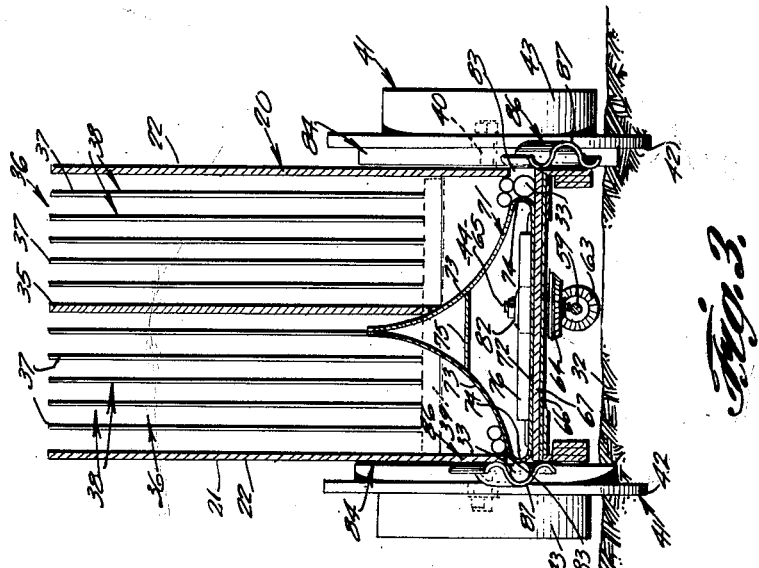

INVENTORS
Elpidio M. Movilla and
Gaudencio T. Bocobo
BY Victor J. Evans & Co.
ATTORNEYS

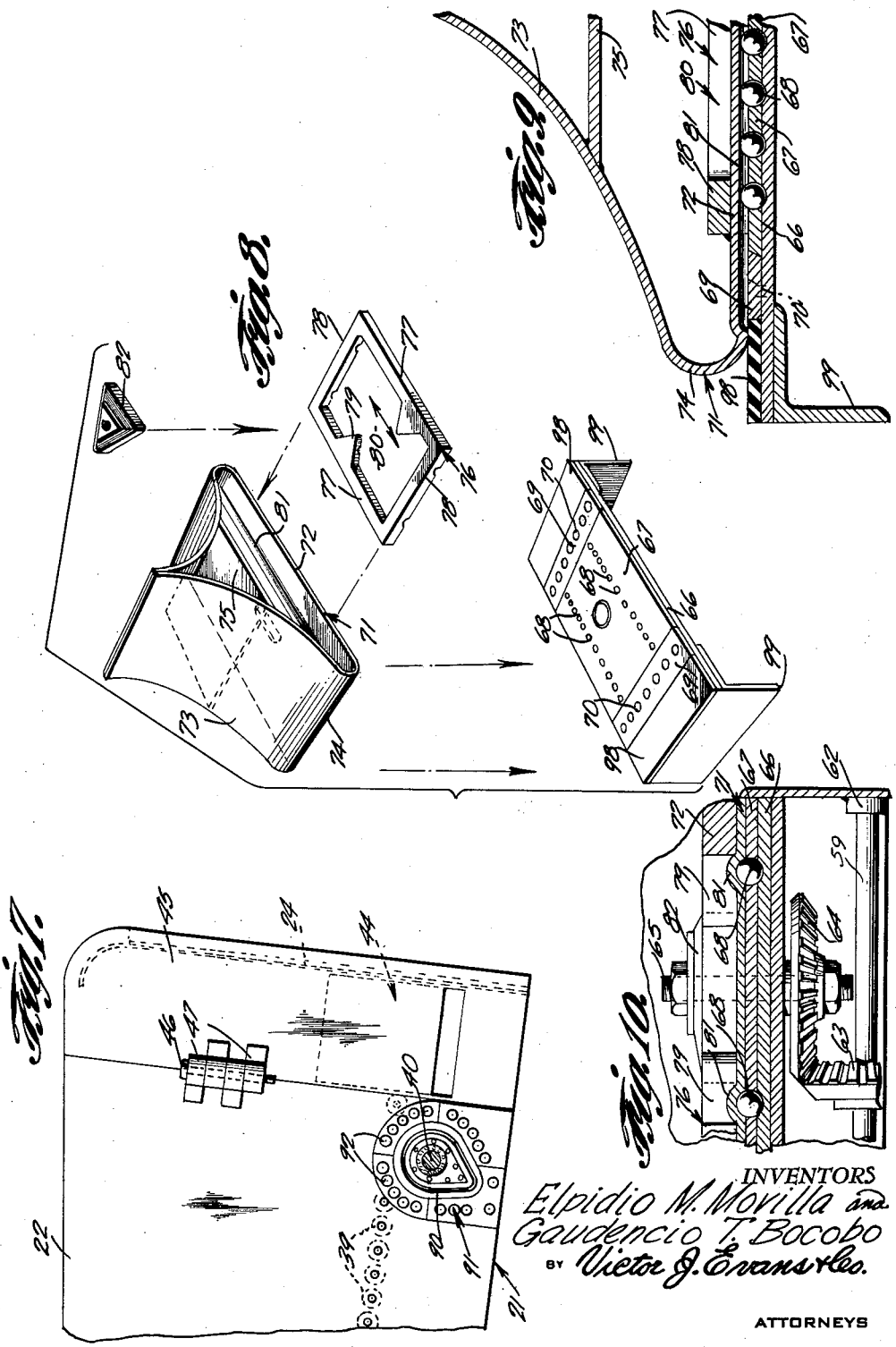

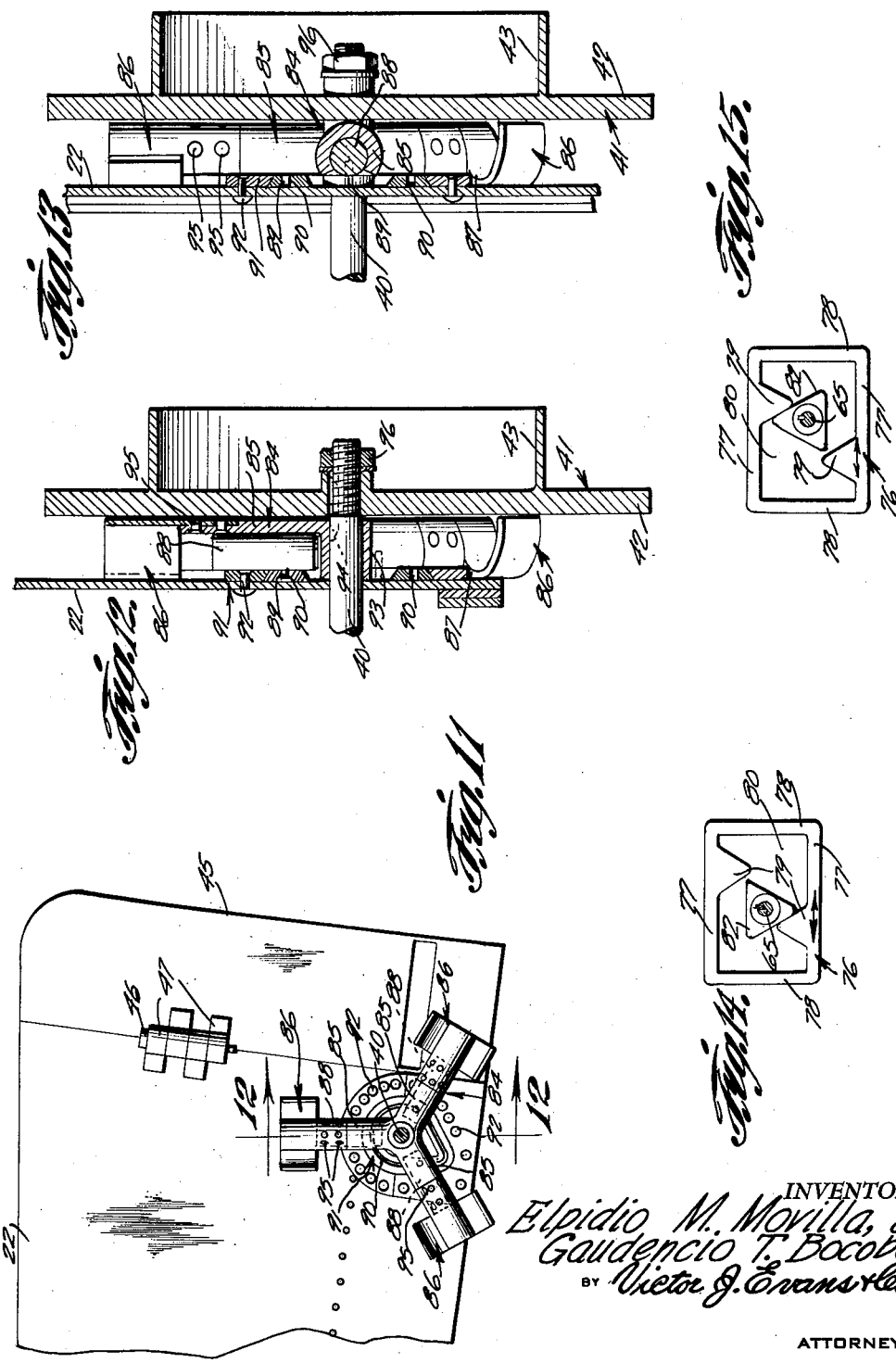

United States Patent Office 3,073,265
Patented Jan. 15, 1963

3,073,265
SUGAR CANE PLANTING MACHINE
Elpidio M. Movilla, 1599 Aragon Sta., Cruz Manila, Republic of the Philippines, and Gaudencio T. Bocobo, Suite 429 and 432, Madrigal Bldg., Escolta St., Manila, Republic of the Philippines
Filed Jan. 14, 1960, Ser. No. 2,490
1 Claim. (Cl. 111—3)

This invention relates to a planting machine, and more particularly to a machine for planting sugar cane stalks.

The object of the invention is to provide a machine which is adapted to be pulled or towed behind a suitable vehicle such as a tractor so that a plurality of stalks or plants such as sugar cane stalks can be readily and conveniently planted in the ground.

Another object of the invention is to provide a sugar cane planting machine which includes a hollow housing or body member that is provided with separate compartments whereby a plurality of stalks which are to be planted can be conveniently arranged in these compartments, and wherein these stalks will move rearwardly by gravity into a feeding chamber and from the feeding chamber, the stakls are automatically discharged into members which effectively plant the stalks in the ground.

Another object of the invention is to provide a planting machine which is especially suitable for planting sugar cane stalks, but it is to be understood that it can be used for planting other types of stalks or plants, and wherein the machine is provided with plows which will form furrows in the ground at the proper points whereby the stalks can be effectively planted, and then the soil is adapted to be moved or engaged by other plows or discs so as to leave the ground in the most desirable condition which will insure the most efficient growth of the plants.

Another object of the invention is to provide a sugar cane planting machine that is especially siutable for handling and planting sugar cane stalks and wherein the machine will eliminate the necessity of planting the stalks by hand so that increased acreage can be planted with savings in time and effort and wherein the planting can be accomplished with greater economy and facility.

A further object of the invention is to provide a sugar cane planting machine which is extremely simple and inexpensive to manufacture.

Other objects and advantages will be apparent in the course of the following description:

In the accompanying drawings, forming a part of this application, and in which like numerals are used to designate like parts throughout the same:

FIGURE 1 is a side elevational view of the sugar cane planting machine of the present invention.

FIGURE 2 is a horizontal sectional view taken on line 2—2 of FIGURE 1.

FIGURE 3 is a transverse sectional showing the feeding mechanism.

FIGURE 4 is a view similar to FIGURE 3 but showing the feeder in a shifted or different position.

FIGURE 7 is a fragmentary rear elevational view showing the construction of the cam and its associated parts.

FIGURE 8 is a perspective view showing certain parts of the feeder disassembled.

FIGURE 9 is a fragmentary sectional view of the feeder.

FIGURE 10 is a fragmentary sectional view showing the gear drive for the feeder.

FIGURE 11 is a fragmentary elevational view showing the stalk holding members and their associated parts.

FIGURE 12 is a sectional view taken on the line 12—12 of FIGURE 11.

FIGURE 13 is a view illustrating certain structural details of the plungers and their associated parts.

FIGURE 14 is a plan view showing the guide member for actuating the feeder.

FIGURE 15 is a view similar to FIGURE 14 but showing the parts in a different or shifted position.

Figure 6:
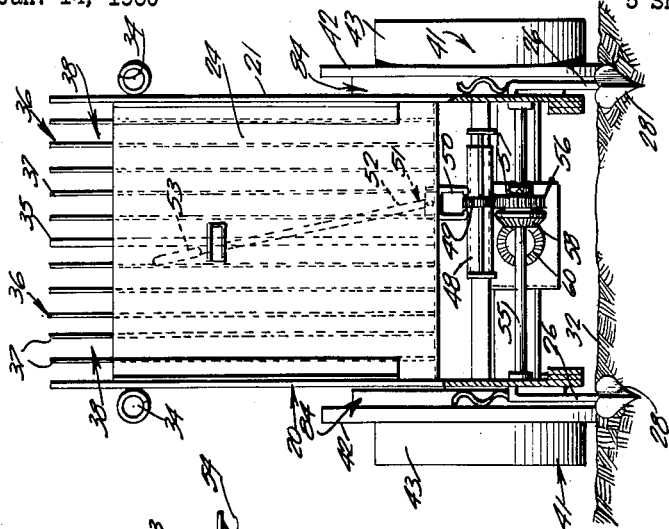
FIGURE 6 is a front view showing certain structural details of the present invention.

Refering in detail to the drawings, the numeral 20 indicates the planting machine of the present invention which is shown to comprise a hollow body member or box like wagon structure 21, and the hollow member 20 is shown to embody a pair of spaced parallel vertically disposed side walls 22 as well as spaced apart front and rear walls 23 and 24, FIGURES 1 and 2. There is provided on the front end of the machine 20 a hitch 25 whereby the machine 20 can be readily towed behind a suitable vehicle such as a tractor.

Depending from the lower portions of the side walls 22 are shanks 26, and the shanks 26 may be secured to the side walls 22 in any suitable manner, as for example by means of securing elements 27. Plows 28 are affixed or secured to lower ends of the shanks 26, and these plows 28 are adapted to dig furrows 31 in the ground 32 whereby plants or stalks such as the sugar cane stalks 33 can be readily planted in the ground as later described in this application. Secured to the rear end of the machine 20 are braces or shanks 29 which support the plows or discs 30. The numeral 34 indicates lights which are suitable affixed to the side walls 22 so that the machine can be used at night.

Extending longitudinally through the body member 21 is a vertically disposed partition 35 which co-acts with the side and end walls of the member to define a pair of spaced apart loading compartments 36. Arranged in each of the compartments 36 are vertically disposed spaced parallel longitudinally extending plates 37 which define spaces 38 therebetween for receiving the stalks 33 which are to be planted by the machine of the present invention. The numeral 39 indicates rollers which are journaled between the partition 35 and side walls 22, and these rollers 39 provide a support for the stalks so that the stalks can move rearwardly through the machine by gravity.

Extending through the lower rear portion of the member 21 is a horizontally disposed axle 40. The numeral 41 designates each of a pair of similar wheels which are connected to the axle 40. Each of the wheels 41 has the same construction and each includes a main circular section 42 as well as a cylindrical flange 43.

The rear portions of the housing or body member 21 is shaped to define a feeding chamber 44. Slats or extensions 45 are connected to the rear portions of the side walls 22 by means of pintles or pins 46 which engage aligned apertured gears 47 on the extensions 45 and side walls 22.

The rotating axle 40 is provided with a splined or ribbed portion 48, and the numeral 49 indicates a gear which is slidably mounted on the splined portion 48 of the axle. A yoke 50 is connected to the gear 49 for shifting the gear 49 along the portion 48 of the axle, and a lever 51 is connected to the yoke 50, the lever 51 including an upwardly extended rearwardly disposed portion 52 which is provided with a hand grip 53 on its upper end. A seat 54 may be provided on the rear of the machine whereby the operator can sit on the seat 54 in order to manually shift the lever 51, so as to selectively move the gear 49.

Mounted below the axle 40 is a horizontally disposed shaft 55 which has a gear 56 affixed thereto, and the gear 56 includes a gear section 57 which is adapted to be selectively engaged by the shifting gear 49 as the lever 51 is shifted. The gear 56 further includes a second or tapered section 58, and a gear 60 on the front end of a shaft 59 meshes with the tapered section 58 of the gear 56. The shaft 59 is arranged at right angles to the shaft 55, and the shaft 59 may be supported in bearings such as the bearings 61 and 62. It is to be understood that bearings, braces, as well as framework for the various parts can be used wherever desired or required.

Secured to the shaft 59 is a gear 63 which meshes with the gear 64 on the lower end of a vertical shaft 65.

As shown in the drawings, there is provided a stationary platform 66, FIGURE 9, and arranged immediately above the platform 66 is a base 67 which serves to support rows of bearings 68, and the base 67 may be held in place by end pieces 69, and the end pieces 69 can be maintained in their proper positions by means of securing elements 70.

There is further provided a removable feeder which is indicated generally by the numeral 71, and the feeder 71 has a generally triangular configuration in cross-section, FIGURE 8, and the feeder 71 includes a bottom portion 72 as well as curved side portions 73 and lower rounded shoulders 74. A web or connecting portion 75 extends between the side portions 73 and is secured thereto or formed integral therewith.

The numeral 76 indicates a bracket which is secured to the upper surface of the bottom portion 72 of the feeder 71, and as shown in the drawings the bracket 76 has a generally open rectangular formation and includes a central open portion 80 which is defined by spaced parallel end sections 78 as well as spaced parallel side sections 77. Triangular shaped lugs 79 extend inwardly from the side sections 77 and are secured thereto or formed integral therewith. The bracket 76 may be secured as by welding to the bottom portion 72 of the movable feeder 71. The bottom portion 72 of the feeder 71 is provided with spaced parallel grooved portions 81 which engage the bearings 68 of the base 67 so as to insure that the feeder 71 can reciprocate or move back and forth with a minimum of friction. The numeral 82 indicates a triangular shaped guide member which is affixed to the upper end of the shaft 65, and the guide member 82 is mounted for movement through the space 80 so as to engage the lug 79, as for example as shown in FIGURES 14 and 15 and whereby as the shaft 65 is rotated, the bracket 76 will be moved back and forth and since the bracket 76 is secured to the feeder 71, it will be seen that this will cause reciprocatory or back and forth sliding movement of the feeder 71.

There is provided adjacent the lower rear portions of the side walls 22 discharge openings 83 for the egress or passage therethrough of stalks 33 which are to be planted. The numeral 84 designates each of a pair of support members of similar construction, one support member 84 being arranged adjacent each of the wheels 41. Each support member 84 includes three portions 85 which are arranged in equal distance spaced apart relation with respect to each other, and the portions 85 have a cylindrical hollow formation for a purpose to be later described. A stalk holding member 86 is connected to the outer end of each portion 85, and the holding members 86 are adapted to be made of a suitable material such as rubber, plastic or the like so that damage or injury to the stalks will be prevented. These holding members 86 are adapted to receive the stalks which are forced or pushed out through the openings 83 from the chamber 44 by the shoulders 74 of the movable feeder 71, as for example as shown in FIGURES 3 and 4. The holding members 86 include intermediate curved sections 87 which receive and grip the stalks.

There is further provided plungers 88 which are adapted to be used for selectively pushing the stalks out of the holding members 86 into the ground, and a means is provided for selectively reciprocating the plungers 88, the plungers 88 being slidably mounted in the curved portions 85 of the support member 84. This means for causing the reciprocation of the plungers 88 comprises pins 89 which are secured to or formed integral with the movable plungers 88, and these pins 89 engage an irregular shaped groove or slot 90 in a cam 91, the cam 91 being stationary and secured to adjacent side walls as for example by means of securing elements 92, FIGURE 12. Each support member further includes a hub 93 which is suitably keyed as at 94 to the adjacent portion of the axle 40. The numeral 95 indicates securing elements such as rivets which are used for fastening the resilient holding members 86 to the portions 85 of the support member 84. A nut or retainer 96 is arranged in engagement with the outer ends of the axle so as to maintain the wheels connected to the axle in order to prevent accidental separation or disengagement of the parts. As shown in FIGURE 7 for example the cam 91 may be made in separate sections which can be fastened or arranged together to define the complete cam having the continuous and irregular grooves 90 therein. As the pins 89 travel throughout the entire path of the grooves 90, the plungers 88 will be caused to reciprocate so as to selectively force stalks out of the holding members 86 and into the proper position in the ground.

The housing or body member 21 is hollow and has its upper portion open whereby the stalks 33 which are to be planted can be readily loaded or positioned in the compartment 36. The plates 37 define the spaces 38 therebetween whereby the plurality of plants can be arranged in the spaces, and the plants are arranged in such a manner that the longitudinal axes of the plants is parallel to the longitudinal axis of the body member 21. The rollers 39 are journaled in the member 21 adjacent the bottom of the compartments 36 and it will be seen that when the device is in the position of FIGURE 1 the rollers 39 are in an inclined position so that the front of the rollers is higher than the rear of the rollers and this arrangement assures that the stalks will move rearwardly by gravity along the rollers 39 and these stalks will then be deposited into the feeding chamber 44 which is located in the rear of the body member 21.

As the machine 20 moves along the ground 32, the wheels 41 have their portions 42 engage the furrows 31 in the ground and the flanges 43 help insure that the wheels will not sink too far down into the ground and as the machine moves along the ground the wheels 41 will turn or rotate. This rotation of the wheels 41 will cause similar rotation of the axle 40 as the wheels are suitably keyed or otherwise secured to the axle 40.

It is to be noted that with the stalks 33 positioned in the feeding chamber 44, as for example as shown in FIGURES 3 and 4, the feeder 71 will move back and forth in a direction which is at right angles to the longitudinal axis of the body member 21. As the feeder 71 moves back and forth, its shoulders 74 will engage the stalks 33 and push these stalks 33 out through the discharge openings 83 and into engagement with the curved portion 87 of a holding member 86. The curved sides 73 of the feeder 71 helps insure that the stalks will move into the path of the shoulder 74. As shown in FIGURES 3 and 4 for example, the parts are arranged and constructed so that the timing will be that first a stalk 33 on one side will be pushed out through an opening 83 and into engagement with the holding member 86, and then a stalk 33 on the other side will be pushed through its adjacent opening 83 and into engagement with the contiguous holding member 86 and this process will be continuous and will be completed as the machine moves along the field so that a plurality of stalks will be planted in two rows simultaneously.

The reciprocation or sliding movement of the feeder 71 is brought about due to the position of the bracket 76 which is secured as by welding to the upper surface of the bottom portion 72 of the feeder 71, and the guide member 82 which is fastened to the upper end of the shaft 65, is positioned in the space 80 and is adapted to engage the spaced apart lugs 79. Thus, it will be seen that as the axle 40 rotates, the gear 49 will rotate since the gear 49 is mounted on the key portion 48 of the axle 40 and when the gear 49 is positioned to mesh with the section 57 of the gear 56, the gear 56 will be rotated so as to cause the gear section 58 to turn which in turn will rotate the shaft 59 due to the position of the intermeshing gears 60 and 58. This rotation of the shaft 59 will cause rotation of the gear 63 which will in turn mesh with the gear 64 so as to rotate the shaft 65 and as the shaft 65 rotates, it turns the guide member 82. As shown in FIGURES 14 and 15, as for example, as the guide member 82 continues to rotate it will engage the lug 79 so as to cause the bracket 76 to move back and forth and since the bracket 76 is fastened or secured to the feeder 71, the feeder 71 will likewise be shifted back and forth so as to push the plants out through the openings 83.

At the same time, the support members 84 are fastened to the axle 40 and each support member includes the three spaced apart portions 85 which each has a holding member 86 secured thereto so that the support members will be rotated and will be carrying the holding members 86 in a circular orbit so that these holding members 86 will move into and out of registry with the discharge openings 83 in order to receive the stalks 33 at the proper instance. As the support members rotate, the plungers 88 will be reciprocated or moved in the portions 85 since the plunger 88 have their pins 89 engaging the continuous irregular grooves 90 in the cam 91 and since the cam is stationary, this will have the effect of causing the plungers 88 to reciprocate in the portions 85 and the grooves in the cam are constructed or arranged in such a manner as to accurately time or insure that the plungers 88 will move outward at the proper instant to push the stalk from the intermediate portions 87 of the holding member 86 whereby this stalk will be pushed into the ground 32 so that the stalk can then later have its lower portion covered with soil by means of the plow discs 30.

The bearings 68 are adapted to be engaged by the grooved portions 81 of the feeder 71 so as to insure that the feeder will move with the greatest of ease and with a minimum amount of friction. By removing the pins 46, the extensions 45 can be removed as for example when access is to be gained to the feeder or its associated parts.

When it is desired to stop operation of the feeder, it is only necessary to manually move the lever 51 by manually engaging the grip 53 whereby the yoke 50 can be used for shifting the gear 49 along the ribbed portion 48 so that the gear 49 can be moved out of engagement with the gear section 57 so that even though the machine 20 is moving along a road or field, nevertheless no further rotation of the shaft 55 and its associated parts will take place since the gear 49 will be out of mesh with the gear 57. When it is desired to again actuate the feeder the lever 52 is shifted so that the gears 49 and 57 are in mesh as shown in FIGURE 6 as for example so that power will be transmitted from the axle 40 through the various gears and shafts as previously described.

The parts can be made of any suitable material and in different shapes or sizes.

As previously stated the feeder 71 feeds the sugar cane stalks 33 to the rubber clip or holding member 86 through the opening 83 and the machine includes the two loading chambers 36 which are arranged parallel to each other and which are separated by the center plate or partition 35. The loading chambers 36 are of a size to accommodate the desired number of stalks which are being handled and the rollers 39 at the bottom of the compartments 36 may be journaled on pins or a shaft so that there will be a continuous flow of the sugar cane stalks to the feeder chamber 44.

Figure 5:
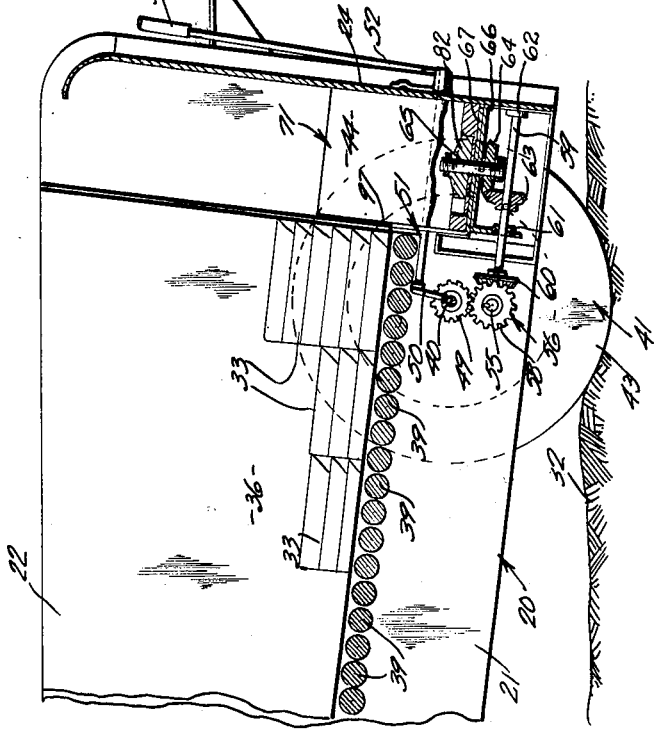
FIGURE 5 is a vertical sectional view showing the rear portion of the machine.

The sugar cane stalks 33 are adapted to be cut in one foot lengths and the openings or slots 83 are of the size to accommodate such a length of sugar cane stalks and when loading the stalks in the loading chambers 36, the stalks are placed one on top of the other in rows so that when the stalks are planted in the soil, the stalks will be properly planted with the bases of the stalks pointing to the rear of the machine. The stalks are arranged in piles and in rows and when the compartments 36 are empty they can be reloaded with additional stalks. A plate 97 (FIGURE 5) is positioned in front of the feeder so as to prevent the entry of the stalks inside the feeder when the rotor or guide 82 is in mesh with the frame or bracket 76 so as to prevent the stalks from interfering with the operation of the parts. The bearings 68 permit sufficient back and forth reciprocation of the feeder and the feeder 71 serves to continuously supply stalks to the alternate rubber clips or holding members 86, as previously described. Each of the support members 84 includes the three spokes or portions 85 which carry plungers 88 and as the machine travels along the fields or ground, the holding members will be continuously supplied with stalks and the plungers will push or thrust the stalks from the holding members into the soil at the proper depth such as to the depth of five inches and the stalks will be arranged at an inclined angle in the ground, as shown in the drawings. The plows 28 are arranged in alignment with the wheel portions 42 so that two rows or furrows 31 are formed in the ground and the stalks are planted exactly along the center of the rows provided by the plow 28, and the discs 30 which are arranged in pairs will cover up with soil the sugar cane stalks as they are being planted in the rows.

In actual practice one loading compartment may be emptied of stalks and then the other compartment can feed stalks to the feeding chamber. The machine can be reloaded when desired, and by promptly manually positioning the lever 51, action of the feeder can be discontinued or controlled as desired. In some instances the number of wheels can be increased so as to increase the loading or handling capacity of the machine. As shown in FIGURES 8 and 9 for example plates 98 which may be made of sponge rubber are provided for protecting and safeguarding the nodes of the sugar cane stalks. The L-shaped beams or plates 99 as shown in FIGURE 9 may be used for providing a support for the feeder assembly. The plates 37 maintain the rows and piles of stalks separated from each other in the loading chambers. Stop members may be provided for limiting sliding movement of the gear 49 on the splined portion 48. The parts as shown in FIGURES 14 and 15 define an escapement wherein the guide 82 functions as a rotor. The loading compartments will insure that there will be a continuous flow of stalks to the feeder chamber and when the stalks are loaded in the compartments the bases of the stalks must point to the rear of the machine. It is to be noted that for each sixty degree increment of a revolution of the wheels, a stalk will be moved into a holding member and then these stalks will be thrust into the soil at a depth, such as the depth of five inches each time the plungers reach their outermost position and the stalks will be planted in alternate arrangements in two rows as for example to a depth of five inches with an alternate distance of six inches from center to center, and the rows are made by the plows 28 which co-act with the center lines of the inner portions of the wheels. The twin disc plows 30 cover up the soil as they are planted in the rows. When the machine is to be reloaded, the machine is disconnected from the towing vehicle, and when the machine is making turns, the operation of the feeder can be discontinued by means of the lever 51 and in addition to being suitable for planting sugar cane, the machine can be used for planting cassava or "Kamoteng Kahoy" stalks or the like.

The following is a detailed explanation of the operation of the present invention. First the feeding chamber 44 is loaded with stalks 33 in piles and in rows as indicated in FIGURES 1 and 2. Loading is likewise done in the compartments 36 with the stalks being loaded in piles, in rows and in series with their longitudinal axes parallel to the longitudinal axes of the compartment 36.

Secondly, the rotor 82 is set as shown in FIGURE 15 and this initial setting of the rotor 82 with the bracket 76, FIGURE 15, corresponds to the initial position of the feeder 71 as shown in FIGURE 3 but it is to be noted that there is no stalk yet that is being fed to the rubber clip 86 since this is the beginning of the operation of the feeder 71. With the feeder 71 being at its farthest left end stroke, there will be a stalk on the right side of the shoulder 74 of feeder 71 as shown in FIGURE 3. At this instant the rubber clip 86 of the left inner wheel 84 coincides with the left slot 83 with the rubber clip 86 on the right inner wheel 84 being 60 degrees below the right slot opening 83, FIGURE 3.

With the gears 49 and 57 in mesh and as the inner wheels 84 move forward for the first 60 degrees increment of a revolution, the stalk 33 which was formerly on the right side of the shoulder 74 of the feeder 71 is fed to the rubber clip 86 of the right inner wheel 84, FIGURE 4, because the rubber clip 86 on the right inner wheel 84 lags 60 degrees from the rubber clip 86 on the left inner wheel 84 as can be seen from FIGURE 3. At this instant the rotor 82 has already assumed the position as shown in FIGURE 14 with the feeder 71 at its farthest right end stroke, FIGURE 4, feeding a stalk 33 to a rubber clip 86 on the right inner wheel 84. Similarly, at this very instant when the feeder 71 is at its farthest right end stroke a rubber clip 86 on the left inner wheel 84 is 60 degrees below the left slot opening 83, with a stalk 33 on the left side of the shoulder 74 of feeder 71 ready to be fed to the rubber clip 86, FIGURE 4.

As the inner wheels 84 together with the rest of the wheels continue to rotate for the next 60 degree increment of a revolution, the feeder 71 again assumes its original position as shown in FIGURE 3 with a stalk 33 being fed to a clip 86 in the inner left wheel 84. The planting of the first stalk 33 by a plunger 88 in the cylindrical hollow formation 85 in the right inner wheel 84 occurs after the wheels have rotated the first 240 degrees. The succeeding stalk is then planted by a plunger 88 in the cylindrical hollow formation 85 in the left inner wheel 84, 60 degrees after the plunger 88 in the cylindrical hollow formation 85 in the right wheel 84 has plunged the first stalk 33 to the ground 32.

From the foregoing, it is evident that alternate staggered planting of the stalks 33 in two rows occurs every 60 degrees rotation of the inner wheels 84.

The purpose of the plate 97 is to fill up the gap just in front of the feeder 71. It is welded inside the lower rear portion of the side walls 22, just below the center line of the last roller 39. The member 75 is adapted to be welded on the front part of the feeder 71 in order to prevent the entry of the stalks inside the feeder itself. It has a clearance of 1/8" with the upper edge of the plate 97.

The vertically disposed spaced parallel longitudinally extending plates 37 provide spaces 38 to accommodate freely the uniform rearward flow of the stalks 33 to the feeding chamber 44. When these compartments are already emptied of the stalks 33, it could be disengaged from the feeding chamber 44 by pulling out pins 46 from the apertured ears 47 on the extension 45 and side walls 22. Then, reloading of the compartments 36 with a fresh supply of stalks 33 takes place. A spare loading compartment 36 may also be provided so as to minimize the time consumed in loading.

Minor changes in shape, size and rearrangement of details coming within the field of invention claimed may be resorted to in actual practice, if desired.

What is claimed is:

In a planting machine, a hollow body member including spaced parallel vertically disposed side walls and spaced apart front and rear end walls, shanks depending from said side walls and secured thereto, ground engaging plows affixed to the lower ends of said shanks, braces mounted rearwardly from the body member, discs affixed to said braces, a vertically disposed partition interposed between said side walls and extended longitudinally through said body member so as to define a pair of separate loading compartments for holding stalks to be planted, a plurality of spaced parallel longitudinally extending plates positioned in each compartment; a plurality of rollers journaled in said body member at the bottom of said compartments; an axle extending through the lower rear portion of said side walls, a pair of similar wheels connected to said axle with each wheel including a main circular section and a cylindrical flange extending outwardly from each of said main circular sections; the rear portion of said body member being provided with a feeding chamber for receiving stalks from the loading compartments; a stationary platform at the rear of the body member having a shaft extending therethrough, means including intermeshing gears operatively connecting the shaft to said axle, a base on said platform having rows of bearings therein, a movable feeder having a bottom portion provided with grooved portions for engaging said bearings, said feeder further including curved side portions and lower rounded shoulders, a bracket secured to the upper surface of the bottom portion of the feeder and said bracket including a central open portion which is defined by end sections and side sections, spaced apart triangular lugs extending inwardly from the side sections of the bracket, a triangular guide member providing a rotor affixed to the upper end of the shaft which extends through the platform and said rotor being mounted to move into and out of engagement with the lugs in said bracket; there being discharge openings adjacent to lower portions of the side walls for receiving stalks from the feeding chamber; a support member arranged contiguous to each wheel and said support member being connected to the axle, each of said support members including a plurality of spoke-like portions arranged in spaced apart relation with respect to each other, resilient stalk holding members affixed to the last named portions and adapted to receive stalks from the feeding chamber, planting means including movable plungers mounted contiguous to said holding members for selectively pushing the stalks out of the holding members, said planting means, plows, and discs being arranged in alignment with respect to each other, and actuating means for the plungers including a cam provided with a groove for receiving pins that are affixed to the plungers.

References Cited in the file of this patent

UNITED STATES PATENTS

| | | |
|---|---|---|
| 1,470,067 | Elias | Oct. 9, 1923 |
| 1,517,715 | De Geus | Dec. 2, 1924 |
| 1,888,831 | Neff | Nov. 22, 1932 |
| 1,972,325 | Acasio | Sept. 4, 1934 |
| 1,996,686 | Poll | Apr. 2, 1935 |
| 2,432,852 | Arvidson | Dec. 16, 1947 |
| 2,617,556 | Hulett | Nov. 11, 1952 |
| 2,708,812 | Nakai | May 24, 1955 |
| 2,726,792 | Seymour | Dec. 13, 1955 |

FOREIGN PATENTS

| | | |
|---|---|---|
| 538,037 | Germany | Nov. 9, 1931 |
| 568,714 | Germany | Jan. 5, 1933 |
| 847,367 | Germany | Aug. 25, 1952 |